United States Patent Office 2,807,607
Patented Sept. 24, 1957

2,807,607

RECOVERY OF ROSIN ACIDS

Eric O. Ridgway, Scotch Plains, N. J.

No Drawing. Application October 6, 1953,
Serial No. 384,519

5 Claims. (Cl. 260—97.6)

This invention is concerned with separating rosin acids from mixed materials containing the same, and more particularly from rosin and tall oil.

Tall oil, in the crude state as recovered from the so-called "black liquor" waste from the kraft paper industry, contains a varying quantity of rosin acids. The balance of the components is made up of fatty acids, unsaponifiables, sterols, etc. In order to supply a uniform tall oil to industry, the manufacturers generally blend crude tall oils in order to obtain a product containing rosin and fatty acids in substantially equal proportions. Thus tall oil as sold has approximately 45% rosin acids, 45% fatty acids and the balance the above-mentioned impurities.

There are a number of known processes directed to the separation of the components of tall oil. However, most of them do not yield the rosin acids of a purity desirable for a large number of uses. Further, in the known processes where the rosin acids can conceivably be recovered in a substantially pure form, the cost involved is such as to make their use uneconomical.

Rosin, either gum or wood, contains about 10% impurities, mostly phenanthrenic hydrocarbons. Included in these impurities are minor amounts of phenolic materials. Among the impurities, whether in the phenanthrenic hydrocarbons or phenolic materials is not yet established, are a number of color-forming substances. These color-forming substances cause, or at least contribute, to the "yellowing" of products containing rosin and its derivatives.

Another disadvantage of rosin is the presence of the hydrocarbons which considerably lower its melting and/or softening point. For instance, commercial rosin as it is sold today has a softening point of 85 to 90° C., yet the rosin acids contained therein when purified have a softening point of about 160° C. This limits the use of rosin where higher melting or softening products made therefrom are desired.

A further disadvantage of rosin due to the presence of the hydrocarbons is that, for many purposes, they contribute nothing desirable, indeed they are often deleterious. For instance, rosin is used for the manufacture of a large number of derivatives. In the manufacture of such derivatives it is the acid radical that is used for the reaction. Thus, in the formation of esters, salts, amines, etc., only about 90% of commercial rosin as obtainable at this time is reactable. The hydrocarbons are uneffected by such reactions, and their presence in the end product is that of impurities.

It is an object of this invention to obtain rosin acids substantially free of hydrocarbons and other impurities from tall oil by the use of a series of selective solvents in which the rosin acids are substantially insoluble, and in which the fatty acid and other components of tall oil are highly soluble. The rosin acids can be in varying proportions each to the others. Thus, they may be in the approximate proportions as present in crude tall oil, or the tall oil can first be hydrogenated, or the rosin acids disproportioned, by known means. Therefore, the rosin acids to be separated according to the method of this invention may be a mixture in varying proportions, each to the others, of abietic acid, neoabietic acid, levo-primaric acid, dextro and iso-dextro- pimaric acids, di- and tetra-hydroabietic acids, and dehydroabietic acids. All of these rosin acids being insoluble in the series of selective solvents contemplated in this invention.

I have discovered that nitroalkane solvents selectively dissolve the fatty acids, hydrocarbons and other impurities in tall oil, or, in the case of rosin, the hydrocarbon or unsaponifiables. Since the rosin acids are substantially insoluble in nitroalkane solvents they are readily separated by known means, such as by filtering or centrifuging. The rosin acids may be further purified by washing with the same solvent, and the solvent collected for use in the next batch. The class of nitroalkane solvents contemplated in this invention includes nitromethane, nitroethane, 1-nitropropane and 2-nitropropane. The nitroalkane solvents have come into commercial usage comparatively recently because of the development of the vapor phase nitration process. Those given above are presently produced in mixtures of two or more thereof, so that when a specific one is mentioned, it is predominant in the nitroalkane so identified. The practicability of the vapor phase nitration of the gaseous alkanes having been demonstrated, the higher nitroalkanes can be so produced, and are contemplated within the scope of my invention, such as nitrobutane. For most purposes, because of efficiency and relative safety of operation and low degree of toxicity, nitroalkane solvents highter than nitromethane are preferred.

Since, for economic reasons, it is desirable to use as little solvent as possible, it is preferred to start with a tall oil as rich as practically possible in rosin acids, although this invention is not limited to this. Therefore, since the rosin acids tend to settle to the bottom of containers of tall oil, it is preferable to start with this sludge. In fact, such sludge can be collected and the rosin acids further concentrated by centrifuging, or by other known methods. When rosin itself is used as a starting material it should be crushed into a powdery form before slurrying.

Since rosin acids are to some extent soluble in fatty acids and unsaponifiables found in tall oil, the yields of substantially pure rosin acids decrease in proportion to the amounts of these materials in the tall oil. Thus, in spite of the insolubility of the rosin acids in the nitroalkane solvents contemplated herein, the yields will decrease in direct ratio to the increase of fatty acids and/or hydrocarbons contained in the starting material. Apart from tall oil and its fractions, so-called polymerized rosin has a relatively high proportion of phenanthrenic hydrocarbons; thus, in accordance with the method of this invention, the yields will be lower in proportion to the increase of such hydrocarbons present in the starting material.

As the precipitated rosin acids are in a finely divided form, a certain amount of them are lost mechanically into the mother liquor and/or washes, particularly when suction or centrifuging is used. However, with starting materials with maximum rosin acid content, recovery of the same is substantially quantitative when washes are used as slurries of subsequent batches.

In a typical example of the practice of this invention tall oil, rich in rosin acids, is slurried with 35 to 65% of its weight of nitroethane. The nitroethane immediately dissolves the fatty acid, hydrocarbons and other impurities in the tall oil. The solution thus obtained may be removed by filtering, centrifuging, or other known means of separating solutions from solids. The undissolved rosin acids, which are substantially all of those initially present in the tall oil, are then washed with small increments of nitroethane. The number of washes being determined by the degree of purity desired in the rosin acids. Usually two or three washes, totalling about 35% of solvent by weight of the rosin acids, will yield rosin acids of sufficiently high melting point and purity for most purposes. The washes are collected and used to slurry the next batch. The filtrate, containing the fatty acid and other components, may be distilled to recover solvent for re-use. The fatty acids can be recovered from the other impurities by known means, such as by fractional distillation, reaction with alkalis, glycerols, etc. It is desirable to carry out the entire process in a closed system in order to avoid excessive loss of solvent.

EXAMPLES

*Example 1.*—A starting material containing 88% rosin acids was used.

100 grams of the above material was slurried with 65 ml. of nitroethane. The slurry was filtered on a Buchner funnel. The rosin acids were then washed with three increments of nitroethane, 35 ml., 65 ml., and 35 ml. respectively. The dry rosin acids thus removed from the tall oil weighed 73 grams and melted between 149 and 153° C. After the solvent was distilled from the first filtrate, the residue containing the impurities was a dark brown oil.

*Example 2.*—A tall oil fraction containing about 87% rosin acids, 11% fatty acids, and 2% impurities was used.

300 grams of tall oil were slurried with 130 ml. of nitroethane and filtered as in Example 1. The filter cake of rosin acids was washed with small increments of fresh nitroethane totalling 120 ml. The yield of substantially pure rosin acids was 226 grams, or about 87% of the rosin acids available in the starting material.

*Example 3.*—The same tall oil and procedures as in Example 2 were used, except that 194 grams of the filtrate and washes collected from Example 2 were used for the initial slurry. Washes in increments of 40 ml., 35 ml., 35 ml. and 30 ml. (140 ml. total) of fresh solvent. The yield of rosin acids was 235 grams, being 90% of the rosin acids available in the starting material, and having a melting point of 147—151° C.

*Example 4.*—This example illustrates the re-use of washes from former batches in a three contact countercurrent process. Thus, in the first contact a wash that had been used twice in former batches was used for the slurry, the second contact used a wash that had been used once in a former batch, and the third contact was fresh nitroethane. The filtrate from the slurry was in each case set aside for recovery of fatty acid and other components and solvent.

300 grams of tall oil (same as used in Example 2) was used for each charge, and 125 grams of nitroethane used in each contact. In each case the slurry was mixed for an hour and then filtered on a Buchner funnel with suction to recover solvent. The whole process was carried out at room temperature.

The results were as follows:

First batch yielded 240 grams rosin acids, app. 92% yield, melting point 151—156° C.

The second batch yielded 241 grams rosin acids, app. 92% yield, melting point 151—156° C.

*Examples 5 to 8.*—In these examples four nitroalkane solvents are compared with each other as to efficiency of operation and yield.

In each case 100 grams of tall oil containing about 87% rosin acids was used. Each was slurried and filtered on a Buchner funnel, and then washed with small increments of fresh solvent.

*Example 5.*—Nitromethane was used. 65 ml. solvent for the slurry and 55 ml. for the washes.

*Example 6.*—1-nitropropane was used. 40 ml. solvent for the slurry and 60 ml. for the washes.

*Example 7.*—2-nitropropane was used. 35 ml. solvent for the slurry and 65 ml. for the washes.

*Example 8.*—Nitroethane was used. 50 ml. solvent for the slurry and 50 ml. for the washes.

The yields of rosin acids were as follows:

Example 5—97 grams rosin acids melting at 133–147° C.—101.2%

Example 6—75.5 grams rosin acids melting at 150–154° C.—86.7%

Example 7—74.9 grams rosin acids melting at 150–154° C.—86.0%

Example 8—80.7 grams rosin acids melting at 150–154° C.—92.8%

It will be noted from Example 5 where nitromethane was used that, although the yield was apparently higher than the available rosin acids, the melting point indicates that the filter cake still contained fatty acids and impurities.

*Example 9.*—In this example crude tall oil was used. The rosin acids contained therein amounted to approximately 42% of its weight, the balance being fatty acids and unsaponifiables, etc.

60 grams of tall oil was slurried with 20 grams of nitroethane and then filtered and washed on the filter with another 10 grams of nitroethane. The rosin acids were then re-slurried with 35 grams of nitroethane and filtered by gravity, and then washed with 20 more grams of nitroethane.

After removal of the occluded nitroalkane by evaporation the recovered rosin acids in the form of a beige powder weighed 14.63 grams, being a yield of approximately 58%. The rosin acids melted at 147—150° C.

*Example 10.*—In this example a distilled tall fraction was used as the starting material. The available rosin acids present in this fraction were approximately 52.5%, the balance being fatty acids, hydrocarbons, etc.

50 grams of the tall oil fraction was slurried with 40 grams of 2-nitropropane and then filtered by gravity. The filter cake was then washed with successive nitroalkane solvent amounting in all to 60 grams.

After removal of the nitroalkane the recovered rosin acids in the form of a white powder weighed 17.98 grams, being a yield of 68.5%. The rosin acids melted at 150–154° C.

*Example 11.*—In this example a tall oil fraction containing approximately 60% rosin acids was used. A mixture of nitroalkane solvents was used containing nitromethane, nitroethane, 1-nitropropane and 2-nitropropane, collected from washes of foregoing examples.

200 grams of tall oil fraction was slurried with 60 grams of nitroalkanes. The filtered rosin acids were re-slurried and refiltered 3 times with 60 grams of nitroalkanes.

The recovered rosin acids in the form of a white powder, after removal of the nitroalkanes, weighed 91.4 grams being a yield of 76.2%.

*Example 12.*—5470 grams of a tall oil fraction containing approximately 87% rosin acids was slurried with 1650 ml. of nitroethane and agitated for 1 hour. The slurry was filtered on a Buchner funnel using a water pump to supply suction on the filter flask. The filter cake was washed with 1000 ml. of fresh solvent.

4062 grams of rosin acids in the form of a white powder were recovered. The melting point was 151–158° C.

All melting points were taken by either the capillary tube-Herchberg method or on a Fisher Johns hot stage melting point apparatus.

What is claimed is:

1. Process of separating rosin acids from tall oil, which comprises treating the tall oil with 35 to 65% of its weight of a nitroalkane to dissolve the remaining constituents of the tall oil and leave the rosin acids undissolved, and then separating the undissolved rosin acids from the nitroalkane solution of the remaining constituents.

2. Process of separating rosin acids from a mixture thereof with other organic materials, which comprises treating the mixture with 35 to 65% of its weight of a nitroalkane produced by the vapor phase nitration process, to dissolve the remaining organic materials and leave the rosin acids undissolved, and then separating the undissolved rosin acids from the nitroalkane solution of the remaining organic constituents.

3. Process of separating rosin acids from a mixture thereof with other organic materials, which comprises treating the mixture with 35 to 65% of its weight of a solvent containing predominantly a nitroalkane of the group consisting of nitromethane, nitroethane, and nitropropane, to dissolve the remaining organic constituents of the mixture and leave the rosin acids undissolved, and then separating the undissolved rosin acids from the nitroalkane solution of the remaining constituents.

4. Process of separating rosin acids from a mixture thereof with other organic materials, which comprises treating the mixture with 35 to 65% of its weight of a nitroalkane solvent containing predominantly nitroethane to dissolve the remaining organic constituents of the mixture and leave the rosin acids undissolved, and then separating the undissolved rosin acids from the nitroalkane solution of the remaining constituents.

5. Process of separating rosin acids from a mixture thereof with other organic materials, which comprises treating the mixture with 35 to 65% of its weight of a nitroalkane solvent containing predominantly a nitropropane to dissolve the remaining organic constituents of the mixture and leave the rosin acids undissolved, and then separating the undissolved rosin acids from the nitroalkane solution of the remaining constituents.

References Cited in the file of this patent

UNITED STATES PATENTS

| | | |
|---|---|---|
| 1,940,372 | Sandqvist | Dec. 19, 1933 |
| 2,117,572 | Rankin | May 17, 1938 |
| 2,170,956 | Vanderbilt | Aug. 29, 1939 |
| 2,278,309 | Freeman | Mar. 31, 1942 |
| 2,373,978 | Segesseman | Apr. 17, 1945 |
| 2,486,974 | Othmer et al. | Nov. 1, 1949 |
| 2,672,458 | Harwood et al. | Mar. 16, 1954 |